US006831276B2

(12) United States Patent
Berger et al.

(10) Patent No.: US 6,831,276 B2
(45) Date of Patent: **\*Dec. 14, 2004**

(54) MICROSCALE MASS SPECTROMETRIC CHEMICAL-GAS SENSOR

(76) Inventors: Philip S. Berger, 9286 Old Bonhomme Rd., St. Louis, MO (US) 63132; W. Ronald Gentry, 201 Kala Heights Dr., Port Townsend, WA (US) 98368; Henry W. Rohrs, 440 S. Gore, Webster Groves, MO (US) 63119

( \* ) Notice: Subject to any disclaimer, the term of this patent is extended or adjusted under 35 U.S.C. 154(b) by 0 days.

This patent is subject to a terminal disclaimer.

(21) Appl. No.: 10/437,142

(22) Filed: May 13, 2003

(65) Prior Publication Data

US 2003/0193021 A1 Oct. 16, 2003

Related U.S. Application Data

(63) Continuation-in-part of application No. 09/850,512, filed on May 7, 2001, now Pat. No. 6,590,207.
(60) Provisional application No. 60/202,421, filed on May 8, 2000.

(51) Int. Cl.[7] .............................................. H01J 49/32
(52) U.S. Cl. ....................... 250/296; 250/291; 250/298; 250/299
(58) Field of Search ................................ 250/296, 291, 250/298, 299

(56) References Cited

U.S. PATENT DOCUMENTS

| | | | |
|---|---|---|---|
| 3,699,330 A | 10/1972 | McGinnis | |
| 3,944,827 A | 3/1976 | Matsuda | |
| 3,984,682 A | 10/1976 | Matsuda | |
| 4,054,796 A | \* 10/1977 | Naito | ........................ 250/294 |
| 4,418,280 A | 11/1983 | Matsuda | |
| 4,727,249 A | 2/1988 | Bateman et al. | |
| 4,851,669 A | 7/1989 | Aberth | |
| 4,859,848 A | \* 8/1989 | Bowman et al. | ............ 250/296 |
| 4,988,869 A | 1/1991 | Aberth | |
| 5,118,939 A | 6/1992 | Ishihara | |
| 5,198,666 A | 3/1993 | Bateman | |
| 5,313,061 A | 5/1994 | Drew et al. | |
| 5,317,151 A | 5/1994 | Sinha et al. | |
| 5,386,115 A | 1/1995 | Freidhoff et al. | |
| 5,401,963 A | 3/1995 | Sittler | |
| 5,536,939 A | 7/1996 | Freidhoff et al. | |
| 5,541,408 A | 7/1996 | Sittler | |
| 5,552,599 A | 9/1996 | Giessmann et al. | |
| 5,614,711 A | 3/1997 | Li et al. | |
| 5,770,857 A | 6/1998 | Fuerstenau et al. | |
| 5,865,631 A | 2/1999 | Berto et al. | |
| 6,501,074 B1 | 12/2002 | Gentry et al. | |
| 6,590,207 B2 | \* 7/2003 | Berger et al. | ................ 250/296 |

FOREIGN PATENT DOCUMENTS

GB 2026231 A 1/1980

\* cited by examiner

*Primary Examiner*—John R. Lee
*Assistant Examiner*—James J. Leybourne
(74) *Attorney, Agent, or Firm*—Armstrong Teasdale LLP

(57) ABSTRACT

A mass sensor, in an exemplary embodiment, includes a housing that includes a first plate, a second plate, and a center portion positioned between the first and second plates. The mass analyzer also includes an ionizer a double focusing mass spectrometer, and an ion detector. The ionizer, the double focusing mass spectrometer, and the ion detector are located in a cavity in the housing. The double focusing mass spectrometer includes an electric sector energy analyzer that includes a first element located on an inside surface of the first plate, and a second element located on an inside surface of the second plate. The first and second elements are substantially concentric and congruent and have a circular arc shape. Each first and second element include a first boundary electrode, a second boundary electrode, and a continuous resistive material extending between the first and second boundary electrodes.

23 Claims, 10 Drawing Sheets

MICROSCALE MASS SPECTROMETRIC CHEMICAL-GAS SENSOR

CROSS REFERENCE TO RELATED APPLICATIONS

This application is a continuation-in-part of U.S. patent application Ser. No. 09/850,521, filed May 7, 2001, now U.S. Pat. No. 6,590,207 which claims the benefit of Provisional patent application No. 60/202,421, filed May 8, 2000.

BACKGROUND OF THE INVENTION

This invention relates generally to mass spectrometers, and more particularly to double focusing mass spectrometers.

Mass spectrometers have earned a respected reputation for their unique ability to identify and quantitate a wide variety of chemical elements and compounds, often present in only trace level concentrations in complex chemical mixtures. Operating in a vacuum chamber, mass spectrometers ionize and fragment sample molecules, and through use of appropriate control and data capture electronics, generate a histogram of fragment molecular weight versus relative abundance of each ionic species present in the sample.

One class of mass spectrometer called a magnetic sector instrument uses a magnetic field at right angles to the ion beam trajectory to separate ions based on their mass-to-charge ratios. Single focusing magnetic sector instruments perform only directional focusing, while double focusing magnetic sector instruments provide both direction and velocity or energy focusing of the ion beam, usually by using an additional electrostatic energy analyzer in tandem with the magnetic sector analyzer, to achieve significantly higher resolution. Traditionally, both single and double focusing mass spectrometers are bulky, typically weighing 100–1500 kg, and thus confined to analytical laboratories due to their large size, weight, high power consumption and need for frequent service by skilled operators. Furthermore, due to their complexity and relatively low unit production rates, they are traditionally hand-made, one at a time, at a relatively high unit cost.

For example, U.S. Pat. No. 3,984,682 to H. Matsuda and U.S. Pat. No. 4,054,796 to M. Naito, show that the size of double focusing mass spectrometers may be significantly reduced by arranging the electric sector energy analyzer within the magnet pole gap. In contrast to tandem electric and magnetic sector analyzers, each of which contributes to the total ion path length, one obvious advantage of superimposing the magnetic and electric fields is a smaller instrument with a shorter ion path length between the ionizer or source and the ion detector. However, this advantage, which reduces the number of ion-molecule collisions, creates new challenges that must be overcome in order to achieve the desired performance. Specifically, it is difficult to generate the required orthogonal electric and magnetic fields within a single small volume without causing serious electric field degradation effects that degrade performance. According to Matsuda and Naito, two cylindrical sector, coaxially-aligned electrodes connected to a voltage source generate a radial electric field used in the energy analyzer portion of a double focusing mass spectrometer. In order to accommodate the small magnet gap axial dimension, these concentric electrodes must have a low axial height-to-separation ratio in order to allow sufficient radial separation to permit ion transmission along the central orbit of the ion beam. The small axial height of these electrodes results in undesirable fringe field effects in the ion path and thus sub-optimal resolution. Further, auxiliary electrodes are added between the upper and lower edges of these cylindrical electrodes to adjust the electric field in the central ion orbit to improve transmission and resolution. While the use of auxiliary electrodes greatly improves the geometry of the electric field in the electric sector, the presence of the cylindrical electrodes ultimately limits the further reduction of the magnet pole gap.

In addition, traditional electromagnets used to generate a 1–2 Tesla magnetic field in a 2 to 10 cm magnet pole gap are prohibitively expensive and bulky compared to rare earth permanent magnets now commonly used in smaller instruments requiring a fixed or non-scanning magnetic field. Furthermore, even with the newest high-energy-product NdFeB magnets, it remains extremely difficult and costly to generate 1–2 Tesla in a magnet pole gap larger than 1 cm.

Further, known mass spectrometers are large in physical size requiring significant installation space, usually in a well-regulated operating environment where temperature, humidity, vibration and other conditions are tightly controlled. Known mass spectrometers use heavy construction materials favoring discrete, usually stainless steel, components including vacuum manifolds, flanges, valves and supporting structural elements. This necessitates low quantity manual construction of each instrument at a relatively high unit cost. Also, known mass spectrometers require high electrical power consumption to run vacuum pumps, heaters, air conditioners, water coolers, electronics and ancillary equipment. Also, the complex design of known mass spectrometers require full-time, specially-skilled operators to use the equipment and perform routine maintenance and repairs, often requiring delicate alignment of internal elements and an inventory of spare parts.

The relatively large physical dimensions of present mass spectrometers require a lower operating pressure than smaller instruments in which ions traverse a shorter path between the ion source and detector. The mean free path length of a molecule in a vacuum system is inversely proportional to pressure and can be approximated by $\lambda = 0.005/P$, where $\lambda$ is the mean-free path length in centimeters and P is the pressure in Torr. As a general design rule, vacuum pumps are employed that maintain the mean free path length to an order of magnitude longer than the actual ion flight path length. Accordingly, microscale instruments can operate at higher sample gas pressure and require smaller, less expensive vacuum pumps. Since vacuum pumps represent some of the highest cost components in conventional mass spectrometers, a significant cost reduction benefit results from smaller, less expensive vacuum pumps.

Additionally, known double focusing mass spectrometers with larger electrode separations require higher voltages to create the same electric field as in smaller, functionally equivalent instruments in which electrodes are closer together. For example, a voltage source of 1000 volts is required to produce an electric field of 10,000 volts/meter between planar electrodes 10 cm apart, while a voltage source of only 50 volts is required to produce the same electric field between electrodes 5 mm apart.

Still further, known double focusing mass spectrometers have traditionally been constructed primarily of stainless steel housings, bolts, valves, transfer lines and structural supports with an essentially unlimited lifetime. Such construction has generally limited these instruments to use in stationary operating environments, typically laboratories or industrial plants.

BRIEF SUMMARY OF THE INVENTION

In one aspect, a mass sensor is provided. In an exemplary embodiment, the mass sensor includes a magnet assembly and a mass analyzer. The mass analyzer includes a housing having a cavity therein with the housing including a first plate, a second plate, and a center portion positioned between the first and second plates. The center portion includes an outer wall. The mass analyzer also includes an ionizer a double focusing mass spectrometer having superimposed orthogonal magnetic and electric fields, and an ion detector. The ionizer, the double focusing mass spectrometer, and the ion detector are located in the housing cavity. The double focusing mass spectrometer includes an electric sector energy analyzer. The electric sector energy analyzer includes a first element located on an inside surface of the first plate, and a second element located on an inside surface of the second plate. The first and second electric sector energy analyzer elements are substantially concentric and congruent and have a circular arc shape. Each first and second element include a first boundary electrode, a second boundary electrode, and a continuous resistive material extending between the first and second boundary electrodes.

In another aspect, a mass analyzer is provided that in an exemplary embodiment includes a housing having a cavity therein with the housing including a first plate, a second plate, and a center portion positioned between the first and second plates. The center portion includes an outer wall. The mass analyzer also includes an ionizer a double focusing mass spectrometer, and an ion detector. The ionizer, the double focusing mass spectrometer, and the ion detector are located in the housing cavity. The double focusing mass spectrometer includes an electric sector energy analyzer. The electric sector energy analyzer includes a first element located on an inside surface of the first plate, and a second element located on an inside surface of the second plate. The first and second electric sector energy analyzer elements are substantially concentric and congruent and have a circular arc shape. Each first and second element include a first boundary electrode, a second boundary electrode, and a continuous resistive material extending between the first and second boundary electrodes.

DETAILED DESCRIPTION OF THE INVENTION

A mass sensor is described in detail below. The mass sensor provides for reduced physical dimensions to take advantage of smaller vacuum pumps allowing higher sample operating pressures and lower operation voltages, and eliminating the need for a well-regulated temperature, humidity and vibration environment. Also, the mass sensor provides significantly reduced sensor weight by eliminating inessential packaging components such as stainless steel vacuum manifolds and flanges and other discrete device elements in favor of newer alternative materials and an integrated design that exploits the use of photolithographic deposition of distributed electrical elements on substrate materials which simplifies and reduces the number of manufacturing steps required in the fabrication process, allowing a higher degree of automation geared to high volume production and a lower cost per unit. Further, the mass sensor provides for reduced operating energy consumption by using smaller vacuum pumps, such as ion pumps, non-evaporable getters, liquid diffusion pumps and miniature mechanical pumps, and by lowering operating voltages and currents to allow operation from smaller energy sources such as automobile batteries and photovoltaic cells facilitating increased portability and deployment in remote locations. Still further, the mass sensor provides for reduced maintenance time and expenses by eliminating access to internal device elements, thus favoring the simple replacement by minimally skilled personnel of a single, disposable integrated mass sensor module in nearly all applications.

Figure 1:
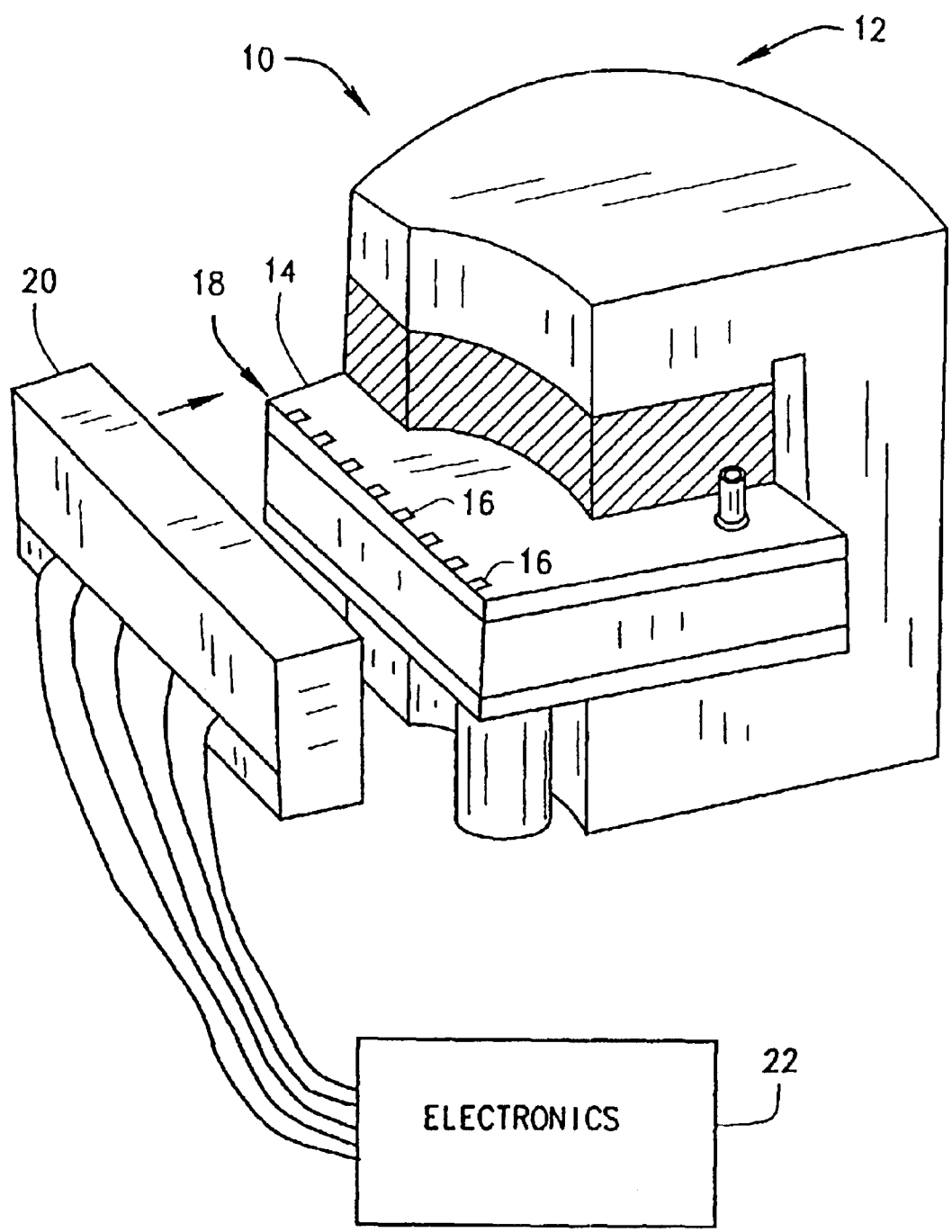
FIG. 1 is perspective view of a mass sensor in accordance with an embodiment of the present invention.

Referring to the drawings, FIG. 1 is perspective view of a mass sensor 10 in accordance with an embodiment of the present invention. Mass sensor 10 includes a magnet assembly 12 and a mass analyzer 14. A plurality of connector electrodes 16 are located along an edge 18 of mass analyzer 14. Connector electrodes 16 are sized and spaced along edge 18 to conform to standard printed circuit edge connector spacing to permit mass analyzer element 14 to be inserted into a printed circuit edge connector 20. Edge connector 20 is connected to operating electronics 22 by a communications cable 24. Any number of different operating electronics configurations can serve to operate mass sensor 10.

Figure 2:
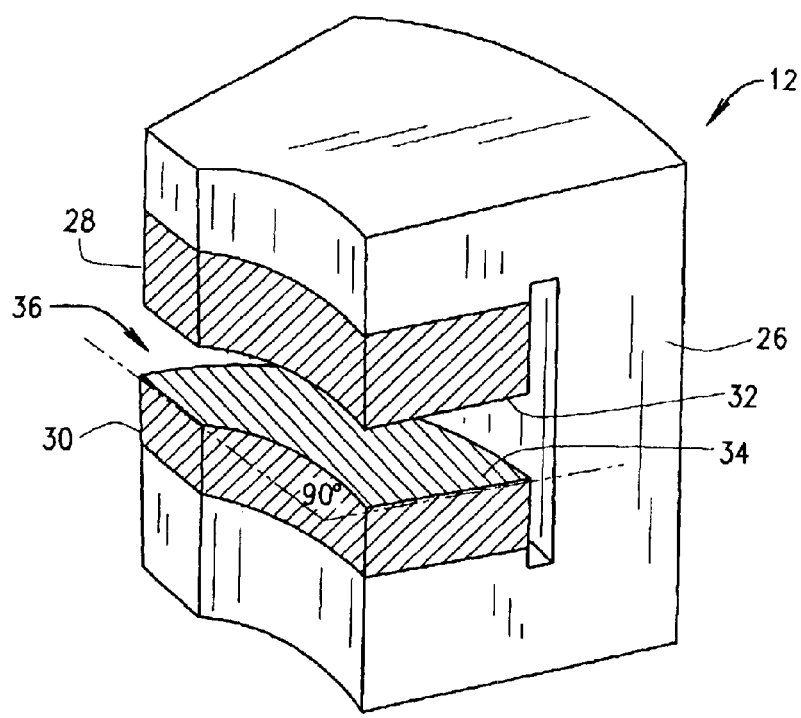
FIG. 2 is a perspective view of the magnet assembly shown in FIG. 1.

FIG. 2 is a perspective view of magnet assembly 12. Referring to FIGS. 1 and 2, magnet assembly 12 includes a ferromagnetic yoke 26, having a substantially C-shaped cross section, a first magnet pole element 28, and a second magnet pole element 30. First and second magnet pole elements 28 and 30 include outer faces 32 and 34 respectively. Magnet pole elements 28 and 30 are positioned so that outer faces 32 and 34 are substantially parallel and proximate to each other and separated by a gap 36 sized to receive mass analyzer 14. In one embodiment, gap 36 is between 3 millimeters (mm) and 10 mm. However, in alternative embodiments, larger gaps 36 can be used with larger and stronger magnet pole elements 28 and 30. Magnet pole elements 28 and 30 are manufactured from rare earth permanent magnets, for example NdFeB magnets and the like. Magnet pole elements 28 and 30 are held in place in ferromagnetic yoke 26 by magnetic attraction to yoke 26.

Figure 3:
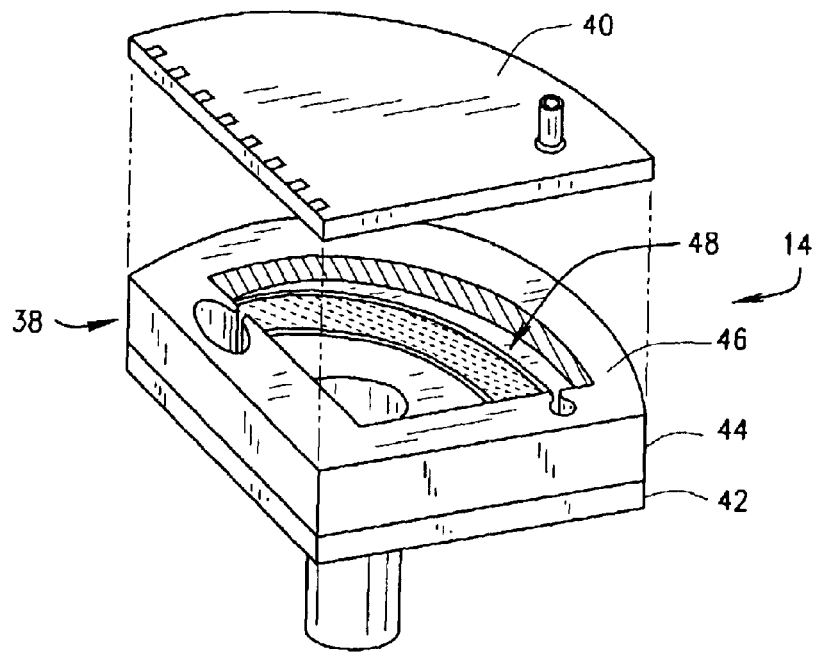
FIG. 3 is a perspective exploded view of the mass analyzer shown in FIG. 1.

FIG. 3 is a perspective exploded view of mass analyzer 14 including a housing 38 formed from a first end plate 40, a second end plate 42, and a center portion 44 positioned between end plates 40 and 42. Center portion 44 includes an outer wall 46 which in combination with end plates 40 and 42 define a cavity 48. End plates 40 and 42, and center portion 44 are fabricated from any suitable material, for example ceramic materials and the like. In one exemplary embodiment, end plates 40 and 42, and center portion 44 are fabricated from a ceramic containing about 96 percent by weight alumina. In an alternate exemplary embodiment, end plates 40 and 42 are fabricated from a resistive material having a bulk resistivity of about $10^4$ ohm-cm to about $10^6$ ohm-cm. Any suitable resistive material can be used, for example, AL800CD controlled resistivity alumina commercially available from Wesgo Ceramics, A Division of Morgan Advanced Ceramics, Inc., Hayward, Calif.

Figure 4:
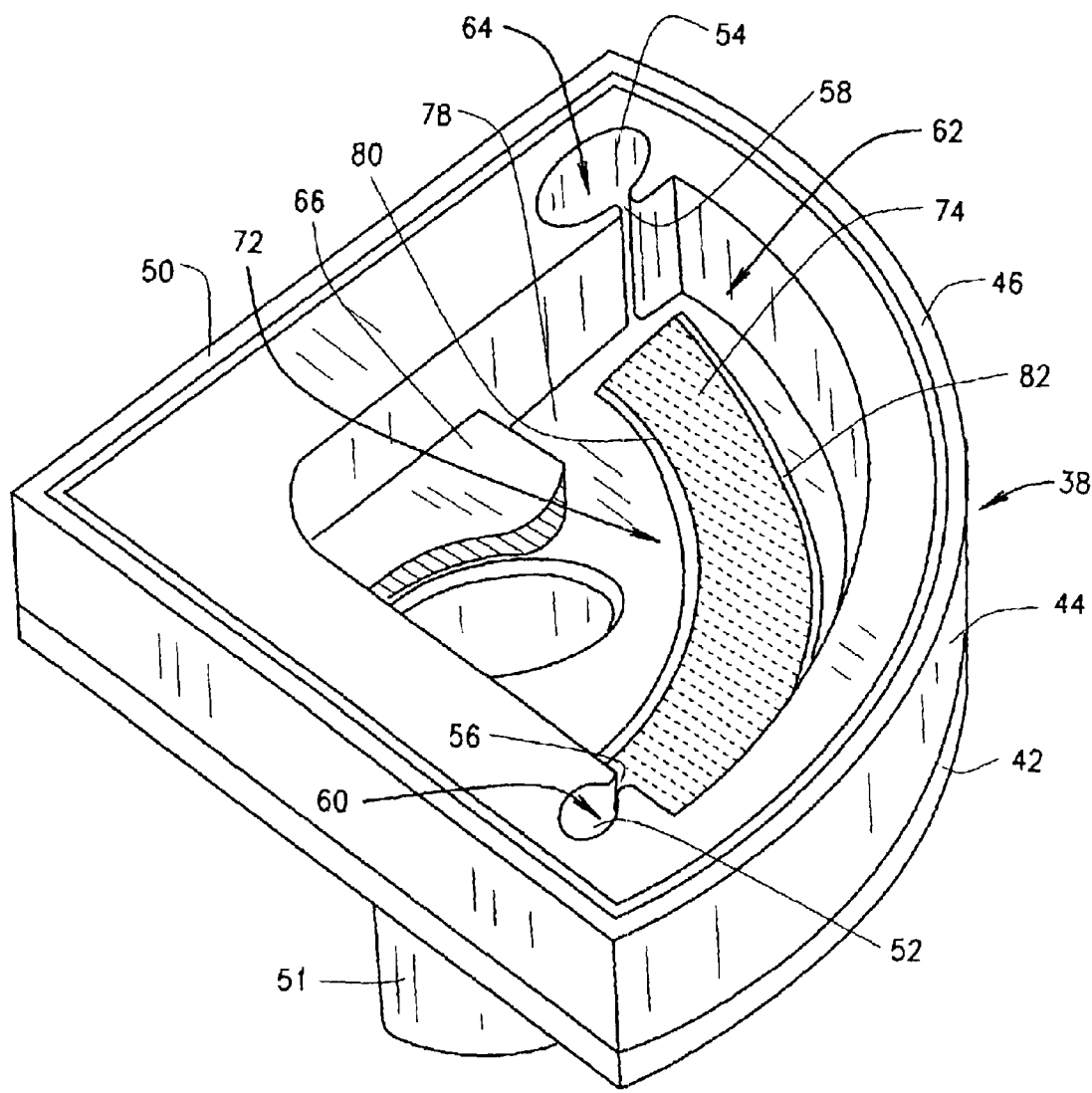
FIG. 4 is a perspective view, with parts missing of the mass analyzer shown in FIG. 3.
Figure 5:
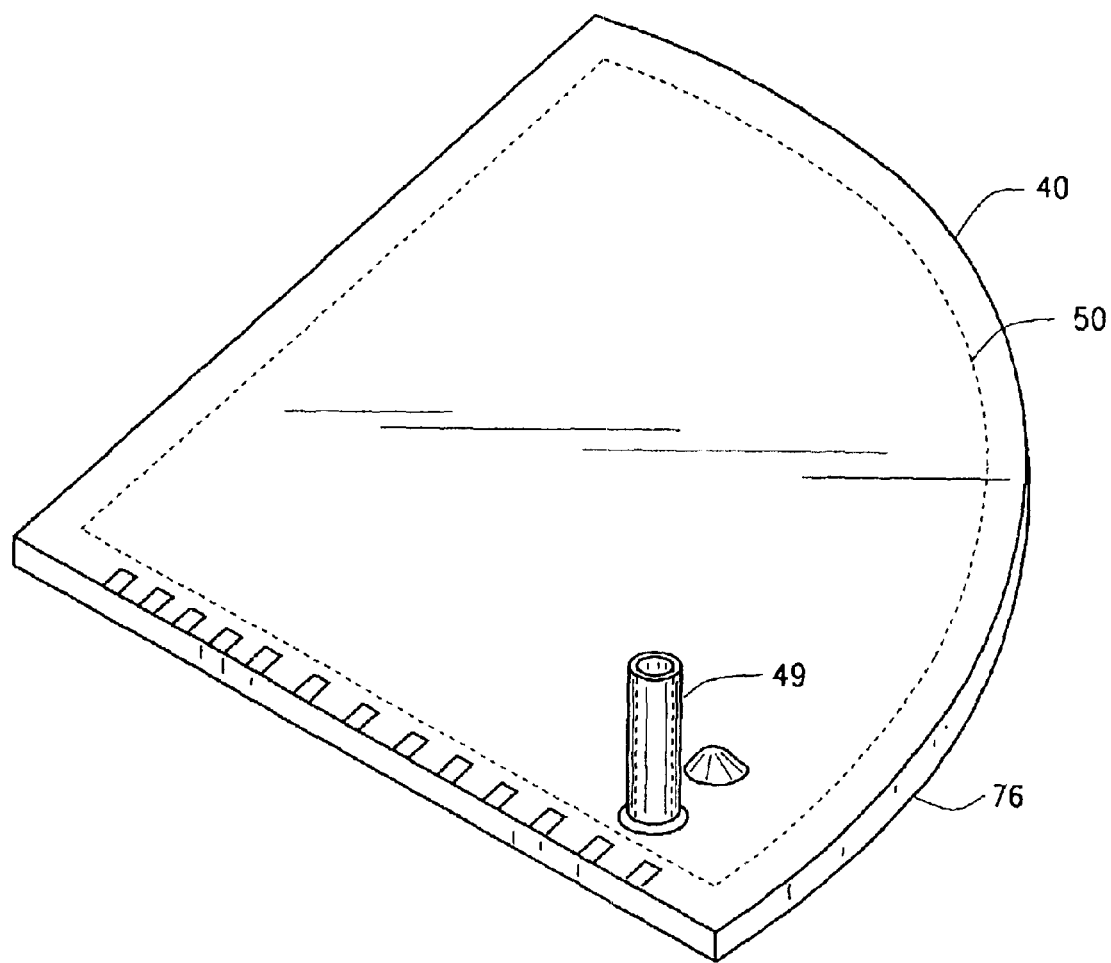
FIG. 5 is a top perspective view of the top plate of the mass analyzer shown in FIG. 1.

Referring also to FIGS. 4 and 5 a gas inlet 49 extends through first end plate 40 and a gas outlet 51 extends through second end plate 42. Soldering rings 50 attach end plates 40 and 44 to center portion 46 to hermetically seal cavity 48. An ionization chamber 52 and an ion detection chamber 54 are located in outer wall 46 of housing center portion 44. A slit 56 connects ionization chamber 52 to housing cavity 48, and slit 58 connects ion detection chamber 54 to housing cavity 48. Gas inlet 49 is in fluid communications with ionization chamber 52. In one embodiment, a sintered metal frit is located in gas inlet 49 to control gas flow.

Figure 7:
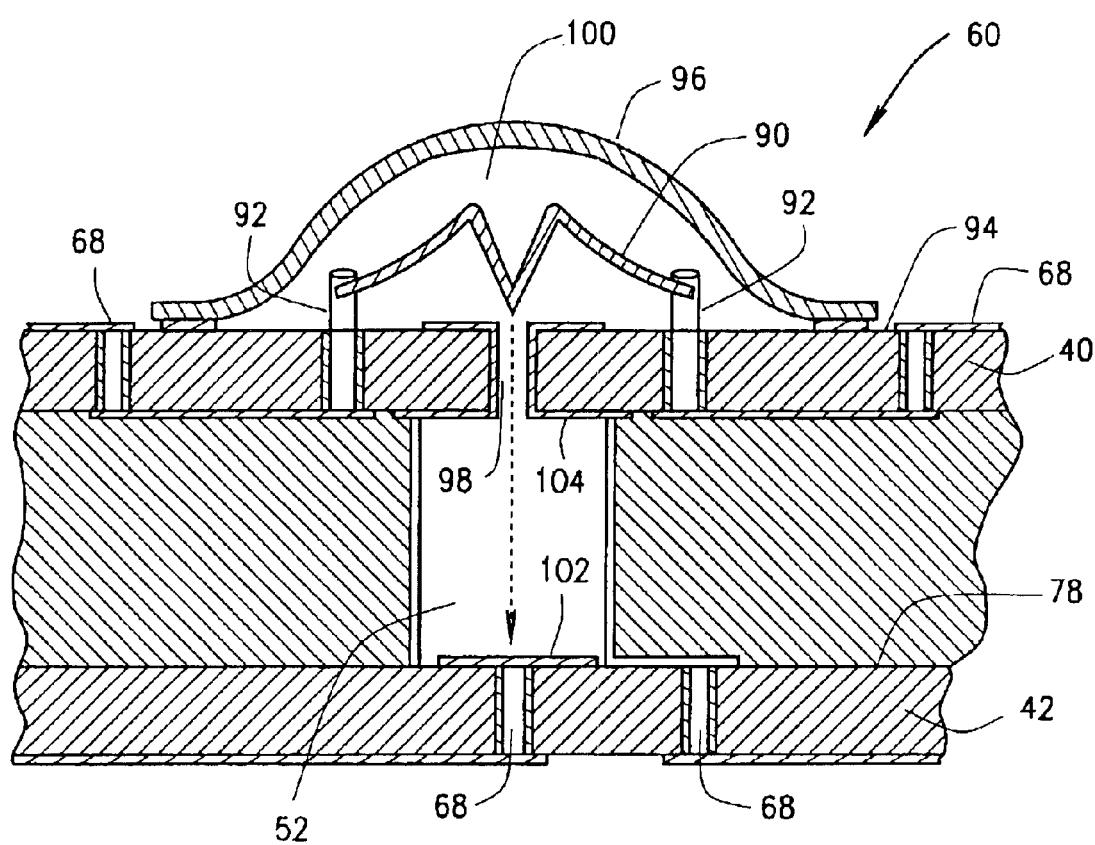
FIG. 7 is a sectional schematic view of a portion of the ionizer shown in FIG. 3.

Contained within housing 38 are a gas ionizer 60, a double focusing mass spectrometer 62, an ion detector 64, a getter 66 and vias 68 (shown in FIG. 7). Vias 68 connect through housing 38 to connector electrodes 16 affixed to the outer surfaces of plates 40 and 42 for electrically connecting all internal elements to operating electronics 22, for example power supplies and amplifiers. Gas ionizer 60 is located in ionization chamber 52 and ion detector 64 is located in ion detection chamber 54.

Figure 6:
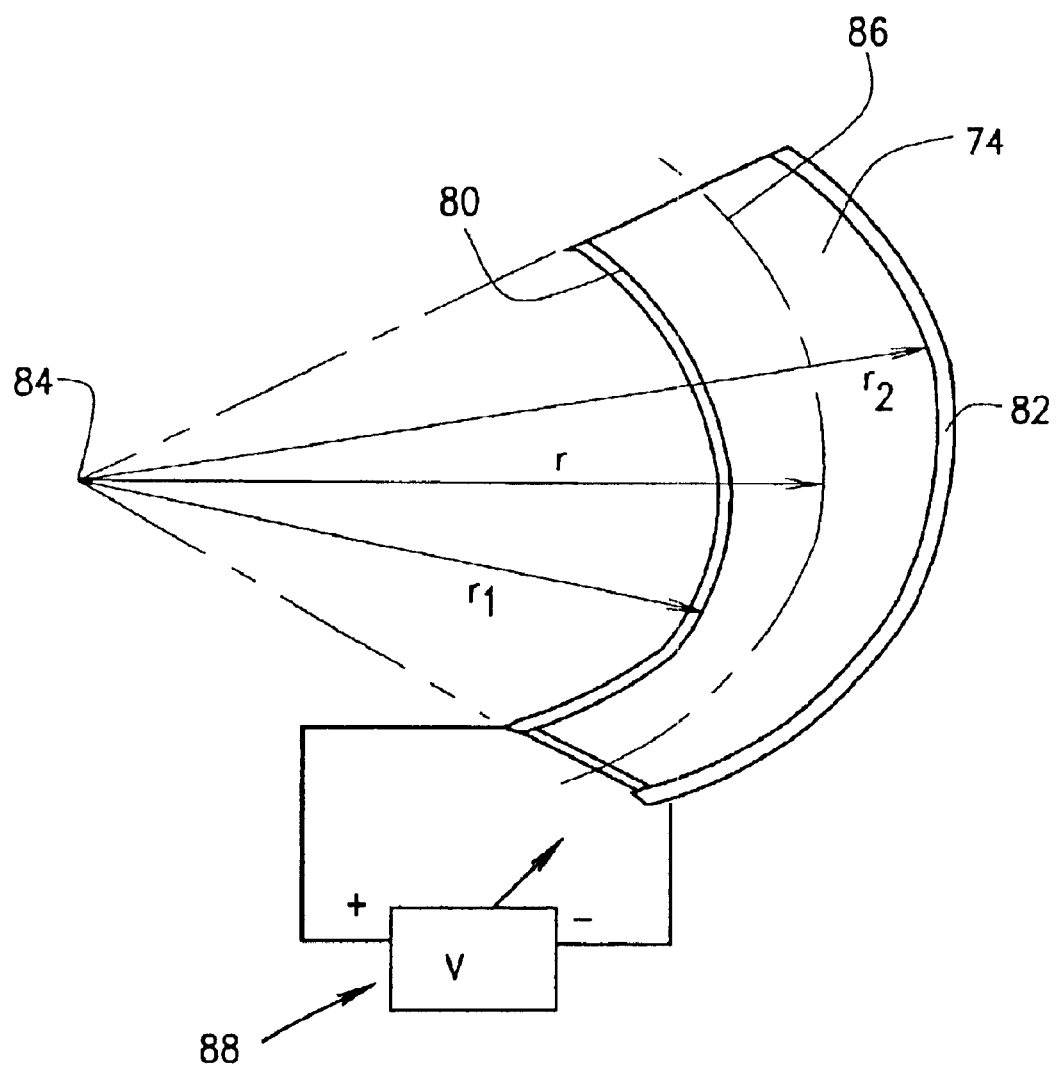
FIG. 6 is a top schematic view of the lower of two parallel element arrangement of the electric sector shown in FIG. 3.

Double focusing mass spectrometer 62 has superimposed orthogonal magnetic and electric fields. The magnetic field is generated by magnet pole elements 28 and 30, and the electric field is generated by an electric sector energy analyzer 72. Electric sector 72 includes two resistors 74 (one shown) with one on an inside surface 76 of first end plate 40 and the other on an inside surface 78 of second end plate 42. Resistors 74 are substantially concentric, congruent, and parallel, and have a circular arc shape. Circular-arc-shaped electric sector resistors 74 are defined by a continuous resistive material of inside surfaces 76 and 78 of end plates 40 and 42 extending between a circular-arc-shaped inner boundary electrode 80 and a circular-arc-shaped outer boundary electrode 82. Referring also to FIG. 6, resistors 74 and boundary electrodes 80 and 82 are all concentric with a central reference point 84 and have an inner and outer radii of curvature $r_1$ and $r_2$ respectively. An ion beam central orbit 86 follows a center radius r between inner and outer boundary electrodes 80 and 82. A variable electric sector voltage source 88 is connected to boundary electrodes 80 and 82 and forms a logarithmically varying differential voltage between boundary electrodes 80 and 82 and a corresponding 1/r varying electric field between plates 40 and 42. A width of each resistor 74 is at least five times the axial separation of resistors 74.

Resistors 74 are formed from a resistive material having a predetermined continuous surface resistance. Resistors 74 can be formed, for example, by lithographically depositing a resistive film on non-conductive inside surfaces 76 and 78 of end plates 40 and 42, by silk screening a conductive ink layer that is subsequently fired for form a resistive coating on non-conductive inside surfaces 76 and 78 of end plates 40 and 42, by forming end plates 40 and 42 from a solid material having a uniform resistivity, by treating inside surfaces 76 and 78 of end plates 40 and 42 optically, chemically, and/or thermally to form a resistive area on inside surfaces 76 and 78, and/or by sputtering or vapor deposition of a resistive material on inside surfaces 76 and 78 of end plates 40 and 42. Also a resistive material can be laminated to non-conductive inside surfaces 76 and 78. When end plates 40 and 42 are formed from a resistive material, a non conductive material is deposited on inside surfaces 76 and 78 adjacent resistors 74.

FIG. 7 is a sectional schematic view of a portion of gas ionizer 60. Ionizer 60 includes a filament 90, which acts as a thermionic electron emitter, mounted on mounting posts 92. Mounting posts 92 are attached to an outer surface 94 of first end plate 40. A filament dome 96 is attached to outer surface 94 and encloses filament 90 and mounting posts 92. Filament 90 is aligned with an electron entry slit 98 in first end plate 40. Slit 98 connects a volume 100 under dome 96 with ionization chamber 52 and is positioned orthogonal to ion exit slit 56 (shown in FIG. 4). An electron trap electrode 102 is attached to inner surface 78 of second end plate 42 and is aligned with electron entry slit 98. An anode electrode 104 is positioned opposite filament 90. Vias 68 connect filament 90, electron trap 102 and anode electrode 104 to their respective connector electrodes 16 (shown in FIG. 1).

Figure 8:
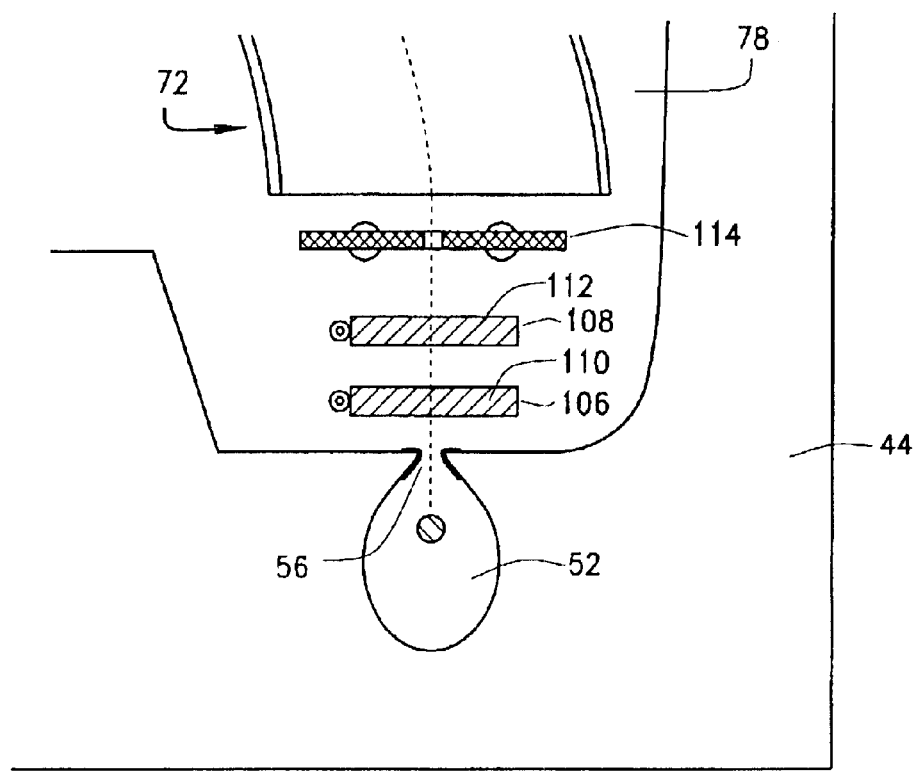
FIG. 8 is a top schematic view of a portion of the bottom plate and housing center portion of the mass analyzer shown in FIG. 1.

Referring also to FIG. 8, an extractor electrode 106 and a focusing electrode 108 are located proximate ion exit slit 56. Extractor electrode 106 is formed by aligned metal strips 110 deposited on inner surfaces 76 and 78 of end plates 40 and 42. Focusing electrode 108 is formed by aligned metal strips 112 deposited on inner surfaces 76 and 78 of end plates 40 and 42. In alternative embodiments, extractor electrode 106 is formed by a metal strip 110 deposited on inner surface 76 or 78, and focusing electrode is formed by a metal strip 112 deposited on inner surface 76 or 78. An object slit electrode 114 is mounted to inner surface 78 of second end plate 42 and is positioned between focusing electrode 108 and electric sector 72.

Figure 9:
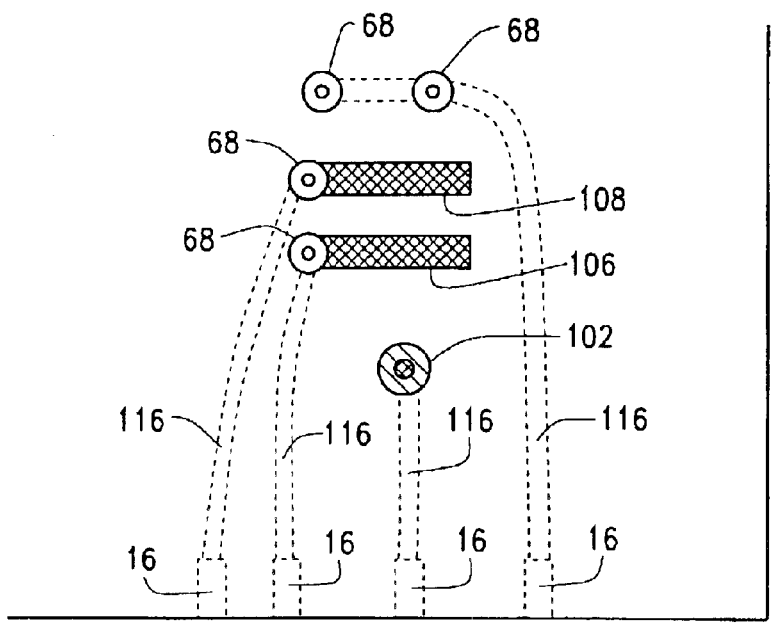
FIG. 9 is a top schematic view of a portion of the bottom plate of the mass analyzer shown in FIG. 1.

FIG. 9 is a top view of a portion of second end plate 42 showing vias 68 connecting electron trap electrode 102, an extractor electrode 106 and a focusing electrode 108 to connector electrodes 16 by pathways 116 photolithographically deposited on an outer surface 118 of second end plate 42.

While the exemplary embodiment of the above described ionizer 60 is a thermionic electron emitter, other ion emitters can also be used, such as radioactive sources, field emitters, microwave generators, electrospray or other conventional ionizers.

Figure 10:
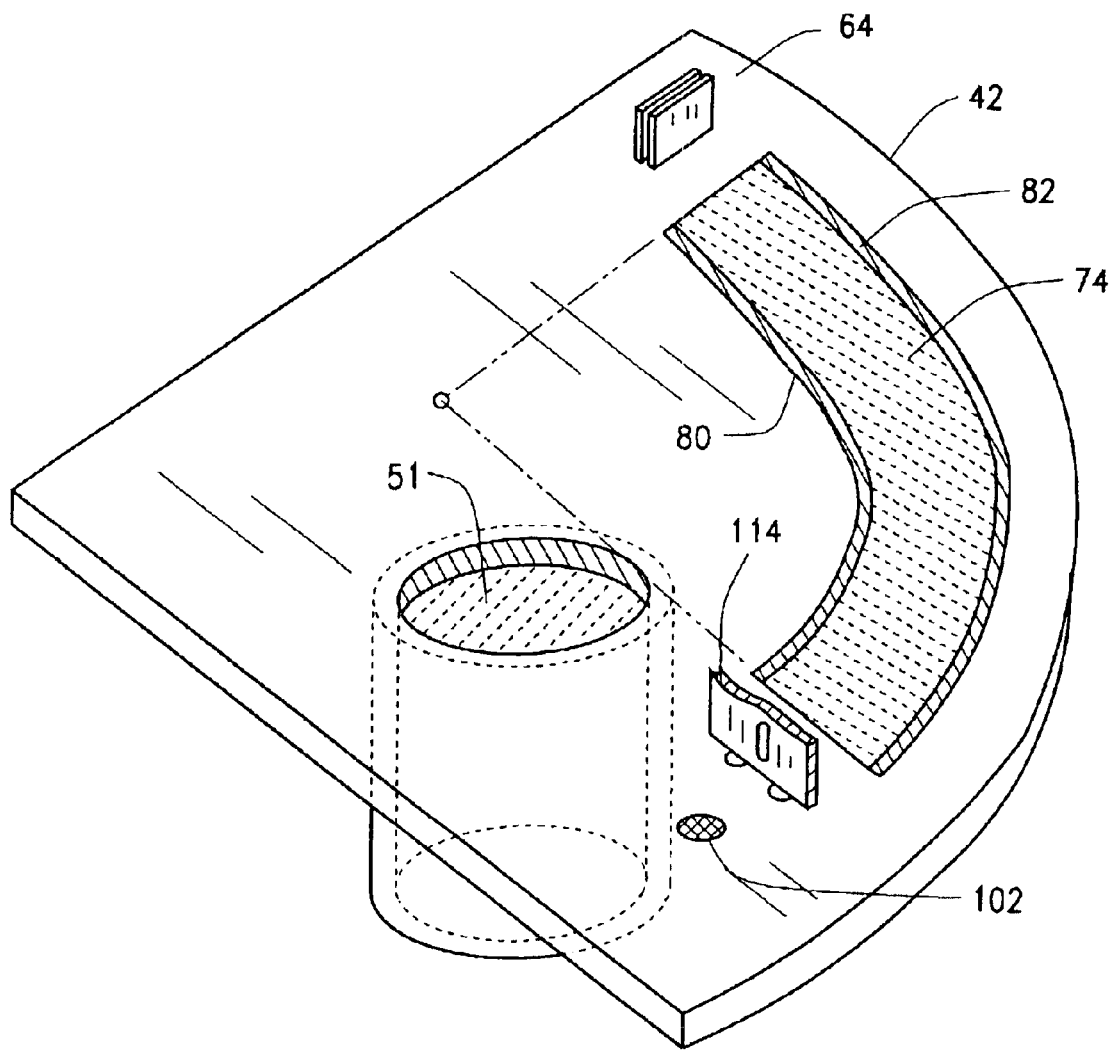
FIG. 10 is a top perspective view of the bottom plate of the mass analyzer shown in FIG. 1.

FIG. 10 is a top perspective view of second end plate 42 showing the positioning of electron trap electrode 102, object slit electrode 114, resistor 74, inner and outer boundary electrodes 80 and 82, ion detector 64, and gas outlet 51.

Figure 11:
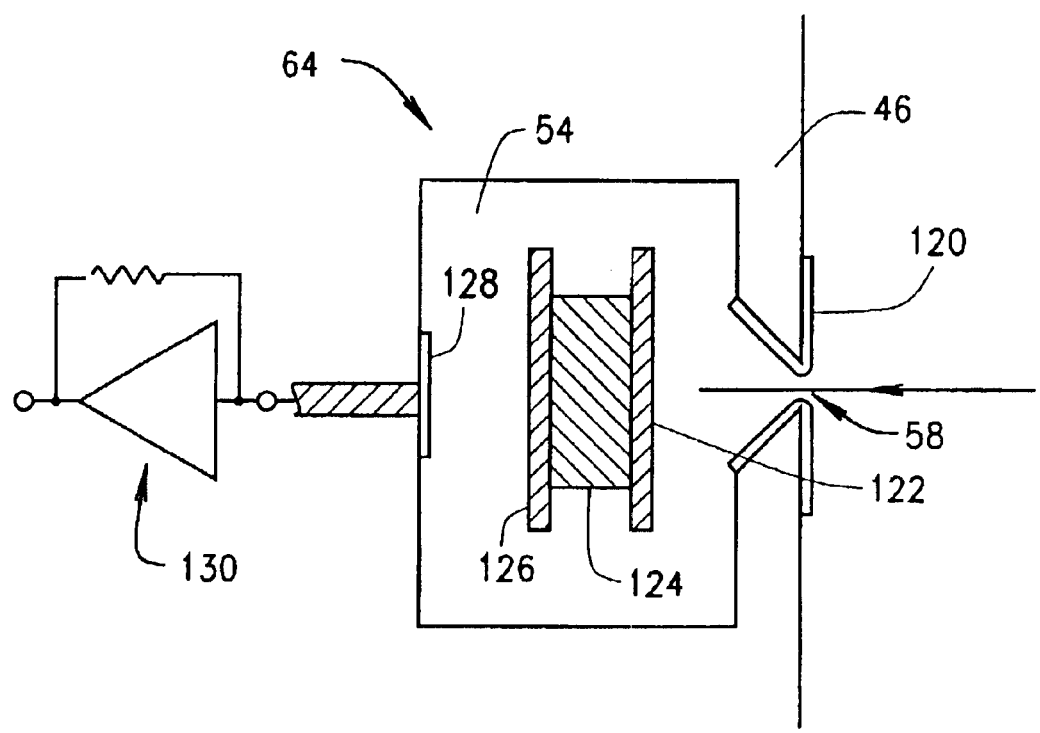
FIG. 11 is a top schematic view of the ion detector shown in FIG. 4.

FIG. 11 is a top schematic view of ion detector 64 positioned in ion detection chamber 54. An image slit electrode 120 is deposited on center portion outer wall 46 in ion detection chamber slit 58. A front microchannel plate electrode 122 is located proximate slit electrode 120. An inner microchannel plate 124 is sandwiched between electrode 122 and a rear microchannel plate electrode 126. An ion signal electrode 128 proximate rear electrode 126 connects to an input of an external electrometer 130. Front and rear microchannel plate electrodes 122 and 126 are connected to an external electron multiplier power supply (not shown) which is included as a part of operating electronics 22 (shown in FIG. 1).

While the exemplary embodiment of the above described ion detector 64 is a microchannel plate detector, other ion detectors can be used, such as discrete dynode electron multipliers, continuous dynode electron multipliers, microsphere detectors, charge coupled arrays and magnetic electron multipliers.

Figure 13:
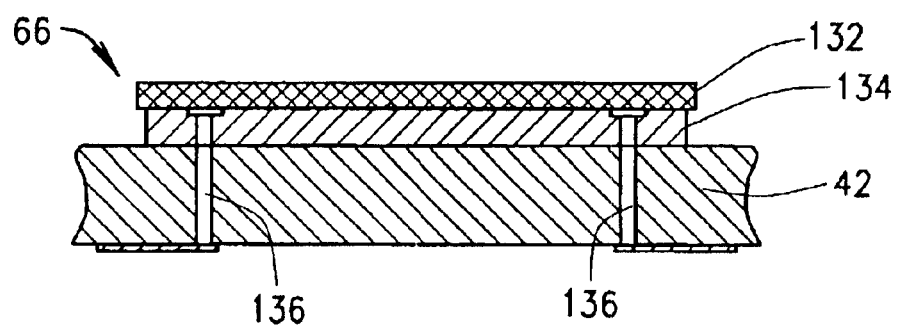
FIG. 13 is a cross sectional view of the mass analyzer through line A—A shown in FIG. 12.
Figure 12:
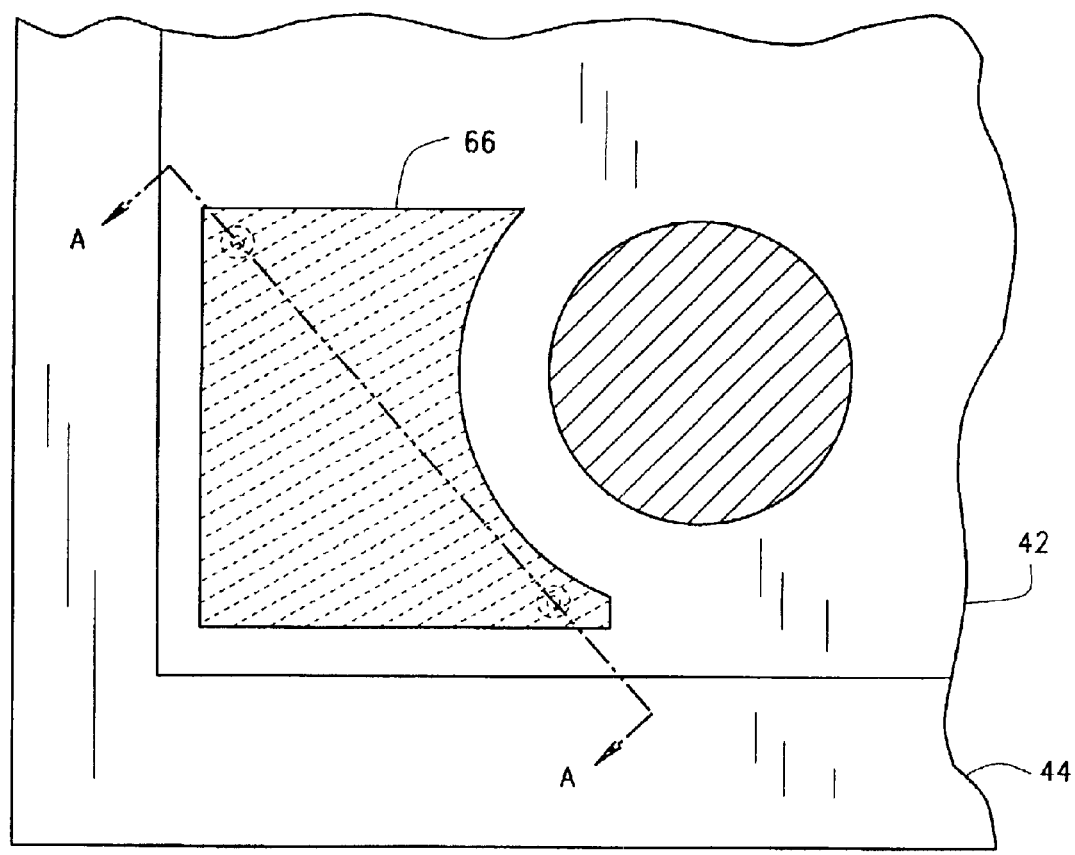
FIG. 12 is a top schematic view of a portion of the bottom plate and housing center portion of the mass analyzer shown in FIG. 1.

FIG. 12 is a top schematic view of a portion of second end plate 42 and housing center portion 44, and FIG. 13 is a cross sectional view through line A—A. Non-evaporative getter 66 includes a getter film 132 deposited on a metal substrate 134. Metal substrate 134 can be fabricated from any suitable metal, for example, a Ni—Cr metal. In one embodiment, getter film 132 is a Zr—V—Fe film which is commercially available from SAES Getters SpA (Milan, Italy). Getter 66 is installed anywhere within housing cavity 48 where it will not interfere with the operation of electric sector 72. Getter 66 provides both initial gas purging of housing cavity 48 and maintains a vacuum when no other vacuum is in operation, such as during shipment when no power is being supplied to hermetically sealed mass sensor 10. Two electrical contacts 136 connected to getter metal substrate 134 permit activation of getter 66 by passing an electrical current through getter metal substrate 134 and heating it to a temperature of 400–900 degrees Celsius for a period of several minutes. Following activation and cooling to a normal ambient operating temperature for mass sensor 10, getter 66 provides additional vacuum pumping of most gases, with the exception of the noble gases, and further enhances the performance of any vacuum that may be connected to mass sensor 10 by gas outlet 51.

Mass analyzer portion 14 of mass sensor 10 operates as a conventional double focusing magnetic sector mass spectrometer with regard to the production, analysis and detection of ions. Briefly, neutral gas molecules entering mass analyzer 14 through inlet 49 are ionized in ionizer 60, extracted from ionizer 60 by an extraction voltage applied to extractor electrode 106 and accelerated by focusing electrode 108 prior to being collimated by object slit electrode 114. The collimated ion beam enters a mass analyzer region formed by orthogonal, superimposed electric and magnetic fields that bend the ion beam into a circular orbit around center point 84 to form ion trajectories around a central orbit 86 between ionizer 60 and ion detector 64. Ions traversing central orbit 86 and in a volume surrounding central orbit 86 are selected by setting a predetermined voltage connected to boundary electrodes 80 and 82 of electric sector 72, thus forming a radial, outward-directed electric field due to a voltage differential across resistor 74. The signs of the electric and magnetic field are chosen such that the forces from the electric and magnetic fields are anti-parallel.

If F is the net force, v is the component of ion velocity in the plane of deflection, and q is the ionic charge, we have $$F = qBv - qE$$

Here a radial positive force is inward and a negative force is outward along the radius of curvature of an ion trajectory through electric sector 72. We can then express the radius of curvature r and its dispersion by $$r = \frac{mv^2}{qBv - qE}$$

and $$\frac{dr}{r} = \left(\frac{Bv - 2E}{Bv - E}\right)\frac{dv}{v},$$

respectively.

Thus we have a special case of double-focusing, viz., zero dispersion of r with respect to v, when the magnetic force is just twice the electric force, i.e., when $$Bv = 2E$$

For an object and image at the entrance and exit of the field boundaries, respectively, this design yields direction-focusing at a deflection angle of $\pi/\sqrt{2}$ (i.e., 127.3°), exactly like a cylindrical electrostatic energy analyzer. For the more convenient 90° deflection angle, the object and image foci are located at about 0.35 r from the field boundaries. The mass selected is given by $$m = \frac{q^2 B^2 r^2}{8E}$$

Ions traversing central orbit 86 are detected by detector 64 and are recorded by external electrometer 130. Particularly, ions traversing the electric and magnetic sectors that exit image slit electrode 120 are drawn to highly negative electrode 122 in ion detector 110 which is held at about −1.5 kilovolts. Ions are accelerated through an aperture striking microchannel plate 124. Electron multiplication within microchannel plate 124 develops an ion current in a manner well-known to anyone skilled in the art, and such current is established in ion signal electrode 128 and carried to an external electrometer 130.

All electrical connections to mass sensor 10 are made through electrodes lithographically printed onto the outside surfaces of upper and lower plates 40 and 42. These contacts are arranged in a pitch and width that conform to standard printed circuit edge connector spacing, typically 2.54 mm or 3.96 mm, thus allowing mass sensor 10 to be conveniently inserted into such a connector and easily replaced.

Mass sensor electronics 22 reside on individual printed circuit boards of conventional design and provide the operating voltages, commands, signals required to operate the device, along with a microcomputer controller operating independently or in conjunction with another computer. Commands and data are transferred between mass sensor 10 and computer(s) through standard communications cables 24. As any number of different electronic configurations might serve to operate mass sensor 10, the electronics are here considered necessary to such operation, but not specifically part of the invention.

The above described mass sensor 10 is relatively small, manufactured from light weight materials, such as ceramics, and has low electrical power requirements. In one embodiment, mass sensor 10 is about 45 mm wide by 45 mm long by 5 mm high with an ion path length of less than 5 cm, allowing operation at pressures above 0.1 milliTorr and, for many applications, a 1 liter/sec pumping capacity. Further, mass spectrometer sensor 10 can be in continuous operation without requiring full-time operators.

While the invention has been described in terms of various specific embodiments, those skilled in the art will recognize that the invention can be practiced with modification within the spirit and scope of the claims.

What is claimed is:

1. A mass sensor comprising a magnet assembly and a mass analyzer, said mass analyzer comprising:
   a housing having a cavity therein, said housing comprising a first plate, a second plate, and a center portion positioned between said first and second plates, said center portion comprising an outer wall;
   an ionizer;
   a double focusing mass spectrometer having superimposed orthogonal magnetic and electric fields; and
   an ion detector, said ionizer, said double focusing mass spectrometer, and said ion detector located in said housing cavity;
   said double focusing mass spectrometer comprising an electric sector energy analyzer, said electric sector energy analyzer comprising:
      a first element located on an inside surface of said first plate; and
      a second element located on an inside surface of said second plate, said first and second elements substantially concentric and congruent and having a circular arc shape, each said first and second element comprising:
         a first boundary electrode;
         a second boundary electrode; and
         a continuous resistive material extending between said first and second boundary electrodes.

2. A mass sensor in accordance with claim 1 wherein said first plate and said second plate comprise a non-conductive material and said continuous resistive material of said first and second elements are laminated to said first and second plates.

3. A mass sensor in accordance with claim 1 wherein said first plate and said second plate comprise a continuous resistive material.

4. A mass sensor in accordance with claim 3 wherein said first plate and said second plate further comprise a non-conductive coating on said inner surface adjacent said first and second elements of said electric sector energy analyzer.

5. A mass sensor in accordance with claim 1 wherein said first plate and said second plate comprise a non-conductive material and said continuous resistive material of said first and second elements is formed by treating said inner surfaces of said first and second plates.

6. A mass sensor in accordance with claim 5 wherein said inner surfaces of said first and second plates are treated by at least one of optical treatment, thermal treatment, and chemical treatment to form a continuous resistive material in a treatment area.

7. A mass sensor in accordance with claim 1 wherein said first and said second plates are hermetically sealed to said housing center portion so that said cavity is hermetically sealed.

8. A mass sensor in accordance with claim 1 wherein said boundary electrodes of said first and said second elements are connected to a variable electrical voltage source, said first and second elements creating a radial outward directed electric field.

9. A mass sensor in accordance with claim 1 wherein said mass analyzer further comprises a non-evaporable getter mounted inside said housing cavity, said non-evaporable getter comprising a Zr—V—Fe film deposited on a metal substrate.

10. A mass sensor in accordance with claim 1 wherein said magnet assembly comprises a ferromagnetic yoke, a first magnet pole element, and a second magnetic pole element, said ferromagnetic yoke comprising a substantially C-shaped cross-section, said first and said second magnet pole elements positioned with substantially parallel proximate faces separated by a gap sized to receive said mass analyzer.

11. A mass sensor in accordance with claim 10 wherein said mass analyzer is positioned in said gap between said first and said second magnet pole elements so that said ionizer and said ion detector are not proximate a magnetic field formed by said first and said second magnet pole elements.

12. A mass sensor in accordance with claim 1 wherein said mass analyzer further comprises external electrical contacts arranged to form a multi-layer printed circuit card that is configured to be installed in a circuit card edge connector.

13. A mass sensor in accordance with claim 1 wherein said ionizer comprises at least one of a thermionic electron emitter, a radioactive source, a field emitter, a microwave generator, and an electrospray ionizer.

14. A mass analyzer comprising:
   a housing having a cavity therein, said housing comprising a first plate, a second plate, and a center portion positioned between said first and second plates, said center portion comprising an outer wall;
   an ionizer;
   a double focusing mass spectrometer; and
   an ion detector, said ionizer, said double focusing mass spectrometer, and said ion detector located in said housing cavity;
   said double focusing mass spectrometer comprising an electric sector energy analyzer, said electric sector energy analyzer comprising:
      a first element located on an inside surface of said first plate; and
      a second element located on an inside surface of said second plate, said first and second elements substantially concentric and congruent and having a circular arc shape, each said first and second element comprising:
         a first boundary electrode;
         a second boundary electrode; and
         a continuous resistive material extending between said first and second boundary electrodes.

15. A mass analyzer in accordance with claim 14 wherein said first plate and said second plate comprise a non-conductive material and said continuous resistive material of said first and second elements are laminated to said first and second plates.

16. A mass analyzer in accordance with claim 14 wherein said first plate and said second plate comprise a continuous resistive material.

17. A mass analyzer in accordance with claim 16 wherein said first plate and said second plate further comprise a non-conductive coating on said inner surface adjacent said first and second elements of said electric sector energy analyzer.

18. A mass analyzer in accordance with claim 14 wherein said first plate and said second plate comprise a non-conductive material and said continuous resistive material of said first and second elements is formed by treating said inner surfaces of said first and second plates.

19. A mass analyzer in accordance with claim 18 wherein said inner surfaces of said first and second plates are treated by at least one of an optical treatment, a thermal treatment, and a chemical treatment to form a continuous resistive material in a treatment area.

20. A mass analyzer in accordance with claim 14 wherein said first and said second plates are hermetically sealed to said housing center portion so that said cavity is hermetically sealed.

21. A mass analyzer in accordance with claim 14 wherein said boundary electrodes of said first and said second elements are connected to a variable electrical voltage source, said first and second elements creating a radial outward directed electric field.

22. A mass analyzer in accordance with claim 14 wherein said mass analyzer further comprises a non-evaporable getter mounted inside said housing cavity, said non-evaporable getter comprising a Zr—V—Fe film deposited on a metal substrate.

23. A mass analyzer in accordance with claim 14 further comprising external electrical contacts arranged to form a multi-layer printed circuit card that is configured to be installed in a circuit card edge connector.

* * * * *